(12) United States Patent
Pan et al.

(10) Patent No.: US 9,083,231 B2
(45) Date of Patent: Jul. 14, 2015

(54) AMPLITUDE MODULATION FOR PASS GATE TO IMPROVE CHARGE PUMP EFFICIENCY

(71) Applicant: SanDisk Technologies Inc., Plano, TX (US)

(72) Inventors: Feng Pan, Fremont, CA (US); Jonathan Huynh, San Jose, CA (US); Sung-En Wang, San Jose, CA (US); Bo Lei, San Ramon, CA (US)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 14/041,522

(22) Filed: Sep. 30, 2013

(65) Prior Publication Data

US 2015/0091637 A1    Apr. 2, 2015

(51) Int. Cl.
*H02M 3/07*    (2006.01)
(52) U.S. Cl.
CPC .......... *H02M 3/07* (2013.01); *H02M 2003/076* (2013.01)
(58) Field of Classification Search
CPC .. H02M 3/07; H02M 3/073; H02M 2003/076
USPC ........................................................ 327/536
See application file for complete search history.

(56) References Cited

U.S. PATENT DOCUMENTS

| | | | |
|---|---|---|---|
| 3,697,860 A | 10/1972 | Baker | |
| 4,511,811 A | 4/1985 | Gupta | |
| 4,583,157 A | 4/1986 | Kirsch et al. | |
| 4,621,315 A * | 11/1986 | Vaughn et al. | 363/60 |
| 4,636,748 A | 1/1987 | Latham | |
| 4,736,121 A | 4/1988 | Cini et al. | |
| 4,888,738 A | 12/1989 | Wong et al. | |
| 5,140,182 A | 8/1992 | Ichimura | |
| 5,168,174 A | 12/1992 | Naso et al. | |
| 5,175,706 A | 12/1992 | Edme | |
| 5,263,000 A | 11/1993 | Van Buskirk et al. | |

(Continued)

FOREIGN PATENT DOCUMENTS

CN    101764518 A    6/2010
CN    101902059       12/2010

(Continued)

OTHER PUBLICATIONS

Feng Pan et al., "Charge Pump Circuit Design", McGraw-Hill, 2006, 26 pages.

(Continued)

*Primary Examiner* — Thomas J Hiltunen
(74) *Attorney, Agent, or Firm* — Davis Wright Tremaine LLP

(57) ABSTRACT

Techniques are presented for improving the efficiency of charge pumps. A charge pump, or a stage of a charge pump, provides its output through a pass gate. For example, this could be a charge pump of a voltage doubler type, where the output is supplied through pass gate transistors whose gates are connected to receive the output of an auxiliary section, also of a voltage doubler type of design. The waveforms provided to the gates of the pass gate transistors are modified so that their low values are offset to a higher value to take into account the threshold voltage of the pass gate transistors. In a voltage doubler based example, this can be implemented by way of introducing diodes into each leg of the auxiliary section.

12 Claims, 6 Drawing Sheets

(56) References Cited

U.S. PATENT DOCUMENTS

| | | | |
|---|---|---|---|
| 5,392,205 A | 2/1995 | Zavaleta | |
| 5,436,587 A | 7/1995 | Cernea | |
| 5,483,434 A | 1/1996 | Seesink | |
| 5,508,971 A | 4/1996 | Cernea et al. | |
| 5,521,547 A | 5/1996 | Tsukada | |
| 5,539,351 A * | 7/1996 | Gilsdorf et al. | 327/379 |
| 5,553,030 A | 9/1996 | Tedrow et al. | |
| 5,563,779 A | 10/1996 | Cave et al. | |
| 5,563,825 A | 10/1996 | Cernea et al. | |
| 5,568,424 A | 10/1996 | Cernea et al. | |
| 5,570,315 A | 10/1996 | Tanaka et al. | |
| 5,592,420 A | 1/1997 | Cernea et al. | |
| 5,596,532 A | 1/1997 | Cernea et al. | |
| 5,602,794 A | 2/1997 | Javanifard et al. | |
| 5,621,685 A | 4/1997 | Cernea et al. | |
| 5,625,544 A | 4/1997 | Kowshik et al. | |
| 5,644,534 A * | 7/1997 | Soejima | 365/185.23 |
| 5,693,570 A | 12/1997 | Cernea et al. | |
| 5,712,778 A * | 1/1998 | Moon | 363/60 |
| 5,732,039 A | 3/1998 | Javanifard et al. | |
| 5,734,286 A | 3/1998 | Takeyama et al. | |
| 5,767,735 A * | 6/1998 | Javanifard et al. | 327/536 |
| 5,781,473 A | 7/1998 | Javanifard et al. | |
| 5,801,987 A | 9/1998 | Dinh | |
| 5,812,017 A | 9/1998 | Golla et al. | |
| 5,818,766 A | 10/1998 | Song | |
| 5,828,596 A | 10/1998 | Takata et al. | |
| 5,903,495 A | 5/1999 | Takeuchi et al. | |
| 5,943,226 A | 8/1999 | Kim | |
| 5,945,870 A | 8/1999 | Chu et al. | |
| 5,969,565 A | 10/1999 | Naganawa | |
| 5,969,988 A * | 10/1999 | Tanzawa et al. | 365/185.23 |
| 5,973,546 A | 10/1999 | Le et al. | |
| 5,982,222 A | 11/1999 | Kyung | |
| 6,008,690 A | 12/1999 | Takeshima et al. | |
| 6,016,073 A | 1/2000 | Ghilardelli et al. | |
| 6,018,264 A | 1/2000 | Jin | |
| 6,023,187 A | 2/2000 | Camacho et al. | |
| 6,026,002 A | 2/2000 | Viehmann | |
| 6,046,935 A | 4/2000 | Takeuchi et al. | |
| 6,104,225 A | 8/2000 | Taguchi et al. | |
| 6,107,862 A | 8/2000 | Mukainakano et al. | |
| 6,134,145 A | 10/2000 | Wong | |
| 6,151,229 A | 11/2000 | Taub et al. | |
| 6,154,088 A | 11/2000 | Chevallier et al. | |
| 6,157,242 A | 12/2000 | Fukui | |
| 6,188,590 B1 | 2/2001 | Chang et al. | |
| 6,198,645 B1 | 3/2001 | Kotowski et al. | |
| 6,208,198 B1 | 3/2001 | Lee | |
| 6,249,445 B1 | 6/2001 | Sugasawa | |
| 6,249,898 B1 | 6/2001 | Koh et al. | |
| 6,275,096 B1 | 8/2001 | Hsu et al. | |
| 6,285,622 B1 | 9/2001 | Haraguchi et al. | |
| 6,288,601 B1 * | 9/2001 | Tomishima | 327/536 |
| 6,297,687 B1 | 10/2001 | Sugimura | |
| 6,307,425 B1 | 10/2001 | Chevallier et al. | |
| 6,314,025 B1 | 11/2001 | Wong | |
| 6,320,428 B1 | 11/2001 | Atsumi et al. | |
| 6,320,796 B1 | 11/2001 | Voo et al. | |
| 6,320,797 B1 * | 11/2001 | Liu | 365/189.11 |
| 6,329,869 B1 | 12/2001 | Matano | |
| 6,344,959 B1 | 2/2002 | Milazzo | |
| 6,344,984 B1 | 2/2002 | Miyazaki | |
| 6,356,062 B1 | 3/2002 | Elmhurst et al. | |
| 6,359,798 B1 | 3/2002 | Han et al. | |
| 6,369,642 B1 | 4/2002 | Zeng et al. | |
| 6,370,075 B1 | 4/2002 | Haeberli et al. | |
| 6,385,107 B1 | 5/2002 | Bedarida et al. | |
| 6,400,202 B1 | 6/2002 | Fifield et al. | |
| 6,404,274 B1 | 6/2002 | Hosono et al. | |
| 6,411,157 B1 | 6/2002 | Hsu et al. | |
| 6,424,570 B1 | 7/2002 | Le et al. | |
| 6,445,243 B2 | 9/2002 | Myono | |
| 6,456,154 B2 | 9/2002 | Sugimura | |
| 6,456,170 B1 | 9/2002 | Segawa et al. | |
| 6,476,666 B1 | 11/2002 | Palusa et al. | |
| 6,486,728 B2 | 11/2002 | Kleveland | |
| 6,518,830 B2 | 2/2003 | Gariboldi et al. | |
| 6,522,191 B1 * | 2/2003 | Cha et al. | 327/536 |
| 6,525,614 B2 | 2/2003 | Tanimoto | |
| 6,525,949 B1 | 2/2003 | Johnson et al. | |
| 6,531,792 B2 | 3/2003 | Oshio | |
| 6,538,930 B2 | 3/2003 | Ishii et al. | |
| 6,545,529 B2 | 4/2003 | Kim | |
| 6,556,465 B2 | 4/2003 | Wong et al. | |
| 6,577,535 B2 | 6/2003 | Pasternak | |
| 6,606,267 B2 | 8/2003 | Wong | |
| 6,661,682 B2 | 12/2003 | Kim et al. | |
| 6,703,891 B2 | 3/2004 | Tanaka | |
| 6,724,241 B1 | 4/2004 | Bedarida et al. | |
| 6,734,718 B1 | 5/2004 | Pan | |
| 6,760,262 B2 | 7/2004 | Haeberli et al. | |
| 6,762,640 B2 * | 7/2004 | Katsuhisa | 327/536 |
| 6,781,440 B2 | 8/2004 | Huang | |
| 6,798,274 B2 | 9/2004 | Tanimoto | |
| 6,819,162 B2 | 11/2004 | Pelliconi | |
| 6,834,001 B2 | 12/2004 | Myono | |
| 6,859,091 B1 | 2/2005 | Nicholson et al. | |
| 6,878,981 B2 | 4/2005 | Eshel | |
| 6,891,764 B2 | 5/2005 | Li | |
| 6,894,554 B2 | 5/2005 | Ito | |
| 6,922,096 B2 | 7/2005 | Cernea | |
| 6,927,441 B2 | 8/2005 | Pappalardo et al. | |
| 6,933,768 B2 | 8/2005 | Hausmann | |
| 6,944,058 B2 | 9/2005 | Wong | |
| 6,954,386 B2 * | 10/2005 | Narui et al. | 365/189.11 |
| 6,975,135 B1 | 12/2005 | Bui | |
| 6,985,397 B2 | 1/2006 | Tokui et al. | |
| 6,990,031 B2 | 1/2006 | Hashimoto et al. | |
| 6,995,603 B2 | 2/2006 | Chen et al. | |
| 7,002,381 B1 | 2/2006 | Chung | |
| 7,023,260 B2 | 4/2006 | Thorp et al. | |
| 7,030,683 B2 | 4/2006 | Pan et al. | |
| 7,092,263 B2 | 8/2006 | Chang | |
| 7,113,023 B2 | 9/2006 | Cernea | |
| 7,116,154 B2 | 10/2006 | Guo | |
| 7,116,155 B2 | 10/2006 | Pan | |
| 7,120,051 B2 | 10/2006 | Gorobets et al. | |
| 7,123,078 B2 | 10/2006 | Seo | |
| 7,129,538 B2 | 10/2006 | Lee et al. | |
| 7,129,759 B2 | 10/2006 | Fukami | |
| 7,135,910 B2 | 11/2006 | Cernea | |
| 7,135,911 B2 | 11/2006 | Imamiya | |
| 7,180,794 B2 | 2/2007 | Matsue | |
| 7,205,682 B2 | 4/2007 | Kuramori | |
| 7,208,996 B2 | 4/2007 | Suzuki et al. | |
| 7,215,179 B2 | 5/2007 | Yamazoe et al. | |
| 7,224,591 B2 | 5/2007 | Kaishita et al. | |
| 7,227,780 B2 | 6/2007 | Komori et al. | |
| 7,239,192 B2 | 7/2007 | Tailliet | |
| 7,253,675 B2 | 8/2007 | Aksin et al. | |
| 7,253,676 B2 | 8/2007 | Fukuda et al. | |
| 7,259,612 B2 | 8/2007 | Saether | |
| 7,276,960 B2 | 10/2007 | Peschke | |
| 7,279,957 B2 | 10/2007 | Yen | |
| 7,345,928 B2 | 3/2008 | Li | |
| 7,348,829 B2 | 3/2008 | Choy et al. | |
| 7,368,979 B2 | 5/2008 | Govindu et al. | |
| 7,397,677 B1 | 7/2008 | Collins et al. | |
| 7,466,188 B2 * | 12/2008 | Fifield | 327/536 |
| 7,468,628 B2 | 12/2008 | Im et al. | |
| 7,495,500 B2 | 2/2009 | Al-Shamma et al. | |
| 7,521,978 B2 | 4/2009 | Kim et al. | |
| 7,554,311 B2 | 6/2009 | Pan | |
| 7,579,902 B2 | 8/2009 | Frulio et al. | |
| 7,579,903 B2 | 8/2009 | Oku | |
| 7,602,233 B2 * | 10/2009 | Pietri et al. | 327/536 |
| 7,667,529 B2 | 2/2010 | Consuelo et al. | |
| 7,671,572 B2 | 3/2010 | Chung | |
| 7,696,812 B2 | 4/2010 | Al-Shamma et al. | |
| 7,772,914 B2 | 8/2010 | Jung | |
| 7,795,952 B2 | 9/2010 | Lui et al. | |
| 7,830,203 B2 | 11/2010 | Chang et al. | |
| 7,928,796 B2 | 4/2011 | Namekawa | |

(56) References Cited

U.S. PATENT DOCUMENTS

| | | |
|---|---|---|
| 7,944,277 B1 | 5/2011 | Sinitsky et al. |
| 7,956,675 B2 | 6/2011 | Saitoh et al. |
| 8,040,174 B2 | 10/2011 | Likhterov |
| 8,040,184 B2 | 10/2011 | Tsuchiya |
| 8,093,953 B2 | 1/2012 | Pierdomineco et al. |
| 8,159,091 B2 | 4/2012 | Yeates |
| 8,193,853 B2 | 6/2012 | Hsieh et al. |
| 8,242,834 B2 | 8/2012 | Chuang et al. |
| 8,339,183 B2 | 12/2012 | Htoo et al. |
| 8,395,440 B2 | 3/2013 | Shandhu et al. |
| 8,604,868 B2 | 12/2013 | Ucciardello et al. |
| 8,643,358 B2 | 2/2014 | Yoon |
| 2002/0008566 A1 | 1/2002 | Taito et al. |
| 2002/0014908 A1 | 2/2002 | Lauterbach |
| 2002/0075063 A1 | 6/2002 | Hwang |
| 2002/0075706 A1 | 6/2002 | Foss et al. |
| 2002/0101744 A1* | 8/2002 | DeMone ............... 363/59 |
| 2002/0130701 A1 | 9/2002 | Kleveland |
| 2002/0130704 A1 | 9/2002 | Myono et al. |
| 2002/0140463 A1 | 10/2002 | Cheung |
| 2002/0163376 A1 | 11/2002 | Papplardo et al. |
| 2003/0128560 A1 | 7/2003 | Saiki et al. |
| 2003/0214346 A1 | 11/2003 | Pelliconi |
| 2004/0046603 A1 | 3/2004 | Bedarida et al. |
| 2005/0024125 A1 | 2/2005 | McNitt et al. |
| 2005/0030088 A1 | 2/2005 | Cernea |
| 2005/0093614 A1 | 5/2005 | Lee |
| 2005/0195017 A1 | 9/2005 | Chen et al. |
| 2005/0237103 A1 | 10/2005 | Cernea |
| 2005/0248386 A1 | 11/2005 | Pan et al. |
| 2006/0114053 A1 | 6/2006 | Sohara et al. |
| 2006/0119393 A1 | 6/2006 | Hua et al. |
| 2006/0244518 A1 | 11/2006 | Byeon et al. |
| 2006/0250177 A1* | 11/2006 | Thorp et al. ............... 327/536 |
| 2007/0001745 A1 | 1/2007 | Yen |
| 2007/0053216 A1 | 3/2007 | Alenin |
| 2007/0069805 A1 | 3/2007 | Choi et al. |
| 2007/0126494 A1 | 6/2007 | Pan |
| 2007/0139099 A1 | 6/2007 | Pan |
| 2007/0139100 A1 | 6/2007 | Pan |
| 2007/0152738 A1 | 7/2007 | Stopel et al. |
| 2007/0210853 A1 | 9/2007 | Maejima |
| 2007/0211502 A1 | 9/2007 | Komiya |
| 2007/0222498 A1 | 9/2007 | Choy et al. |
| 2007/0229149 A1 | 10/2007 | Pan et al. |
| 2008/0024096 A1 | 1/2008 | Pan |
| 2008/0024198 A1 | 1/2008 | Bitonti et al. |
| 2008/0042731 A1 | 2/2008 | Daga et al. |
| 2008/0068067 A1 | 3/2008 | Govindu et al. |
| 2008/0111604 A1 | 5/2008 | Boerstler et al. |
| 2008/0116963 A1 | 5/2008 | Jung |
| 2008/0136500 A1 | 6/2008 | Frulio et al. |
| 2008/0157731 A1 | 7/2008 | Pan |
| 2008/0157852 A1 | 7/2008 | Pan |
| 2008/0157859 A1 | 7/2008 | Pan |
| 2008/0218134 A1 | 9/2008 | Kawakami |
| 2008/0239802 A1 | 10/2008 | Thorpe |
| 2008/0239856 A1 | 10/2008 | Thorpe |
| 2008/0278222 A1 | 11/2008 | Conti et al. |
| 2008/0307342 A1 | 12/2008 | Furches et al. |
| 2009/0033306 A1 | 2/2009 | Tanzawa |
| 2009/0051413 A1 | 2/2009 | Chu et al. |
| 2009/0058506 A1 | 3/2009 | Nandi et al. |
| 2009/0058507 A1 | 3/2009 | Nandi et al. |
| 2009/0091366 A1 | 4/2009 | Baek et al. |
| 2009/0121780 A1 | 5/2009 | Chen et al. |
| 2009/0121782 A1 | 5/2009 | Oyama et al. |
| 2009/0153230 A1 | 6/2009 | Pan et al. |
| 2009/0153231 A1 | 6/2009 | Pan et al. |
| 2009/0153232 A1 | 6/2009 | Fort et al. |
| 2009/0167418 A1 | 7/2009 | Ragavan |
| 2009/0174441 A1 | 7/2009 | Gebara et al. |
| 2009/0184697 A1 | 7/2009 | Park |
| 2009/0219077 A1* | 9/2009 | Pietri et al. ............... 327/536 |
| 2009/0315598 A1 | 12/2009 | Namekawa |
| 2009/0315616 A1 | 12/2009 | Nguyen et al. |
| 2009/0322413 A1 | 12/2009 | Huynh et al. |
| 2010/0019832 A1 | 1/2010 | Pan |
| 2010/0033232 A1 | 2/2010 | Pan |
| 2010/0074034 A1 | 3/2010 | Cazzaniga |
| 2010/0085794 A1 | 4/2010 | Chen et al. |
| 2010/0118625 A1 | 5/2010 | Matano |
| 2010/0127761 A1 | 5/2010 | Matano |
| 2010/0244935 A1 | 9/2010 | Kim et al. |
| 2010/0283549 A1 | 11/2010 | Wang |
| 2010/0302877 A1 | 12/2010 | Bang |
| 2011/0026329 A1 | 2/2011 | Wada |
| 2011/0133821 A1 | 6/2011 | Honda |
| 2011/0156803 A1 | 6/2011 | Yap et al. |
| 2011/0176370 A1 | 7/2011 | Izumi et al. |
| 2011/0254615 A1 | 10/2011 | Raghunathan et al. |
| 2012/0230071 A1 | 9/2012 | Kaneda |
| 2012/0274394 A1 | 11/2012 | Chan |
| 2013/0162229 A1 | 6/2013 | Chan |
| 2013/0181521 A1 | 7/2013 | Khlat |
| 2014/0085985 A1 | 3/2014 | Pan et al. |
| 2014/0375293 A1 | 12/2014 | Pan et al. |

FOREIGN PATENT DOCUMENTS

| | | |
|---|---|---|
| DE | 10 2007 026290 | 7/2008 |
| EP | 0 382 929 A | 8/1990 |
| EP | 0 780 515 A | 6/1997 |
| JP | 2007-020268 | 1/2007 |
| WO | 01/06336 A1 | 1/2001 |
| WO | WO 2006/132757 | 12/2006 |

OTHER PUBLICATIONS

Louie Pylarinos et al., "Charge Pumps: An Overview", Department of Electrical and Computer Engineering University of Toronto, 7 pages.

Ang et al., "An On-Chip Voltage Regulator Using Switched Decoupling Capacitors," 2000 IEEE International Solid-State Circuits Conference, 2 pages.

U.S. Appl. No. 12/506,998 entitled "Charge Pump with Current Based Regulation" filed Jul. 21, 2009, 21 pages.

U.S. Appl. No. 12/634,385 entitled "Multi-Stage Charge Pump with Variable Number of Boosting Stages" filed Dec. 9, 2009, 33 pages.

First Office Action issued for Chinese Patent Application No. 2011800614031 mailed on Feb. 3, 2015, 4 pages.

Notice of Allowance in U.S. Appl. No. 13/926,442, mailed May 13, 2015, 9 pages.

Pylarinos et al., "Charge Pumps: An Overview," Department of Electrical and Computer Engineering, University of Toronto, Proceedings of Symposium May 2003, 7 pages.

\* cited by examiner

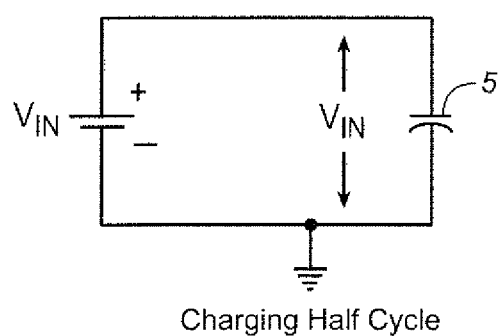
FIG. 1A Charging Half Cycle
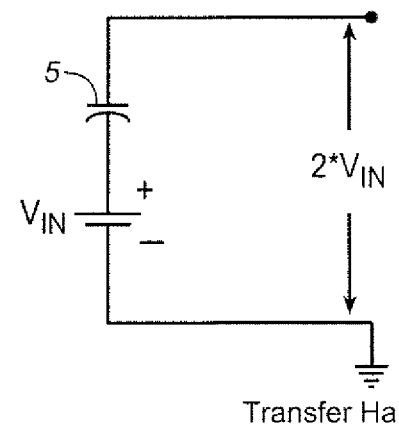
FIG. 1B Transfer Half Cycle
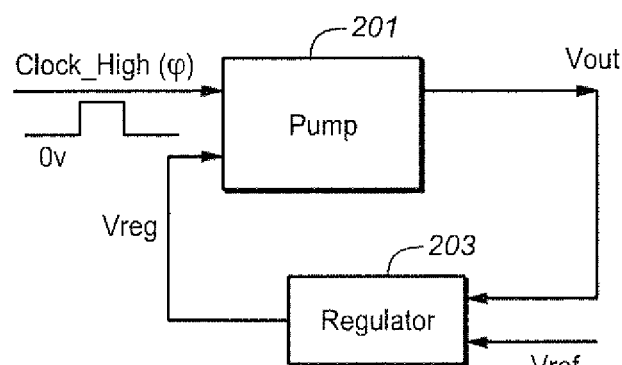
FIG. 2

Non Overlapping Clocks

Non Overlapping Clocks

US 9,083,231 B2

AMPLITUDE MODULATION FOR PASS GATE TO IMPROVE CHARGE PUMP EFFICIENCY

FIELD OF THE INVENTION

This invention pertains generally to the field of charge pumps and more particularly to improving the efficiency of charge pumps.

BACKGROUND

Charge pumps use a switching process to provide a DC output voltage larger or lower than its DC input voltage. In general, a charge pump will have a capacitor coupled to switches between an input and an output. During one clock half cycle, the charging half cycle, the capacitor couples in parallel to the input so as to charge up to the input voltage. During a second clock cycle, the transfer half cycle, the charged capacitor couples in series with the input voltage so as to provide an output voltage twice the level of the input voltage. This process is illustrated in FIGS. 1a and 1b. In FIG. 1a, the capacitor 5 is arranged in parallel with the input voltage $V_{IN}$ to illustrate the charging half cycle. In FIG. 1b, the charged capacitor 5 is arranged in series with the input voltage to illustrate the transfer half cycle. As seen in FIG. 1b, the positive terminal of the charged capacitor 5 will thus be $2*V_{IN}$ with respect to ground.

Charge pumps are used in many contexts. For example, they are used as peripheral circuits on flash and other non-volatile memories to generate many of the needed operating voltages, such as programming or erase voltages, from a lower power supply voltage. A number of charge pump designs, such as conventional Dickson-type pumps, are know in the art. But given the common reliance upon charge pumps, there is an on going need for improvements in pump design, particularly with respect to trying to reduce the amount of layout area and the efficiency of pumps.

SUMMARY OF THE INVENTION

A method of operating a charge pump circuit, where the charge pump has one or more stages each having one or more legs, including a first leg connected between an output node for the corresponding stage and an input node for the corresponding stage receiving an input voltage for the stage. The first leg has a first capacitor with a first plate connected to an internal node of the leg and a first output transistor connected between the internal node and the output node of the corresponding stage. The method includes: applying a first clock signal to a second plate of first capacitor, the first clock signals value alternating between a high value and a low value; and applying a second clock signal to the gate of the first output transistor. The second clock signal is of the same phase as the first clock signal and has a low value that is higher than the voltage at the source of the first output transistor when value of the first clock signal is low by a voltage offset not higher than the than the threshold of the first transistor.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

The various aspects and features of the present invention may be better understood by examining the following figures, in which:

FIG. 1a is a simplified circuit diagram of the charging half cycle in a generic charge pump.

FIG. 1b is a simplified circuit diagram of the transfer half cycle in a generic charge pump.

FIG. 2 is a top-level block diagram for a regulated charge pump.

DETAILED DESCRIPTION

Figure 3A:
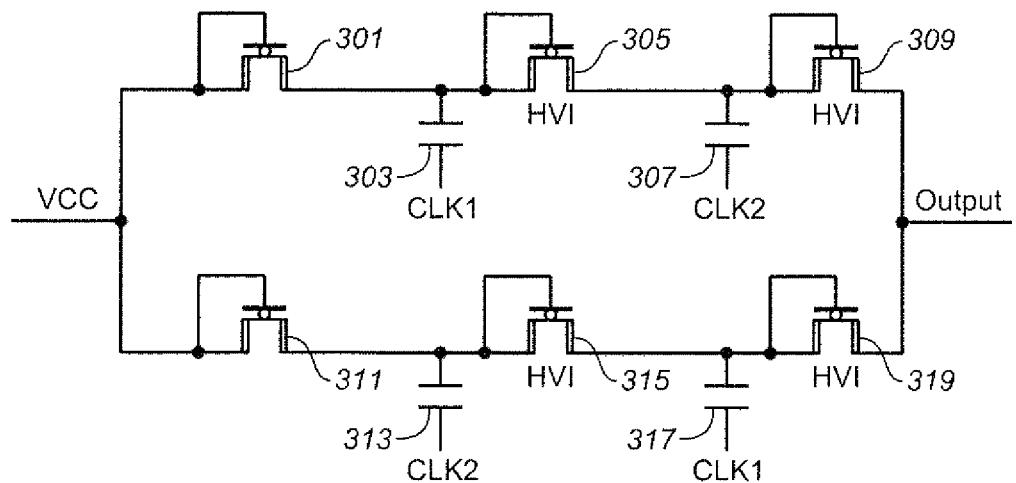
FIGS. 3A and 3B show a 2 stage, 2 branch version of a conventional Dickson type charge pump and corresponding clock signals.

The techniques presented here are widely applicable to various charge pump designs that use the threshold voltage cancelation signals for the switches used to prevent the backflow of charge after pump stages. In the following, the description will primarily be based on an exemplary embodiment using a voltage doubler-type of circuit, but the concepts can also be applied to other pump designs.

More information on prior art charge pumps, such as Dickson type pumps, and charge pumps generally, can be found, for example, in "Charge Pump Circuit Design" by Pan and Samaddar, McGraw-Hill, 2006, or "Charge Pumps: An Overview", Pylarinos and Rogers, Department of Electrical and Computer Engineering University of Toronto, available on the webpage "www.eecg.toronto.edu/~kphang/ece1371/chargepumps.pdf". Further information on various other charge pump aspects and designs can be found in U.S. Pat. Nos. 5,436,587; 6,370,075; 6,556,465; 6,760,262; 6,922,096; 7,030,683; 7,554,311; 7,368,979; 7,795,952; 7,135,910; 7,973,592; and 7,969,235; US Patent Publication numbers 2009-0153230-A1; 2009-0153232-A1; 2009-0315616-A1; 2009-0322413-A1; 2009-0058506-A1; US-2011-0148509-A1; 2007-0126494-A1; 2007-0139099-A1; 2008-0307342 A1; 2009-0058507 A1; 2012-0154023; 2012-0154022; and 2013-0063118; and U.S. patent application Ser. Nos. 13/618,482; 13/628,465; 13/886,066; and 13/921,072

FIG. 2 is a top-level block diagram of a typical charge pump arrangement. The designs described here differ from much of the prior art in details of how the pump section 201. As shown in FIG. 2, the pump 201 has as inputs a clock signal and a voltage Vreg and provides an output Vout. The high (Vdd) and low (ground) connections are not explicitly shown. The voltage Vreg is provided by the regulator 203, which has as inputs a reference voltage Vref from an external voltage source and the output voltage Vout. The regulator block 203 regulates the value of Vreg such that the desired value of Vout can be obtained. The pump section 201 will typically have cross-coupled elements, such at described below for the exemplary embodiments. (A charge pump is typically taken to refer to both the pump portion 201 and the regulator 203, when a regulator is included, although in some usages "charge pump" refers to just the pump section 201.)

Figure 3B:
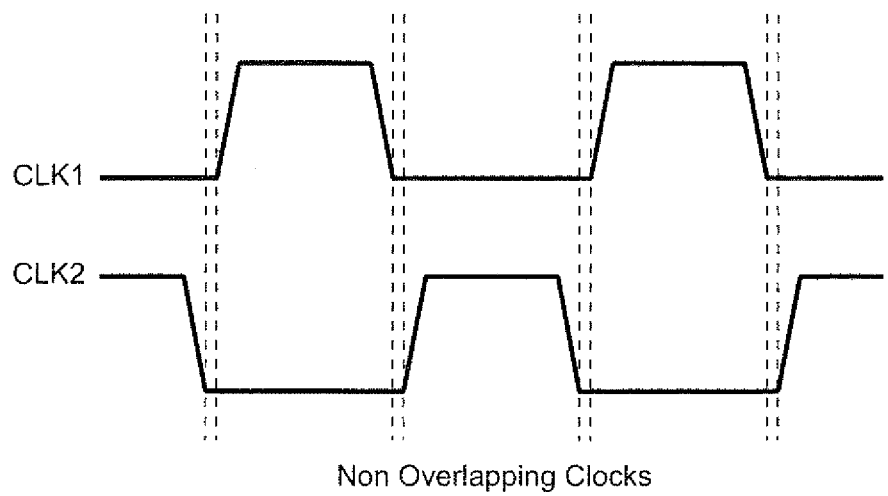

FIG. 3A shows a 2 stage, 2 branch version of a conventional Dickson type charge pump that receives Vcc as its input voltage on the left and generates from it an output voltage on the right. The top branch has a pair of capacitors 303 and 307 with top plates connected along the branch and bottom plates respectively connected to the non-overlapping clock signals CLK1 and CLK2, such as those shown in FIG. 3B. The capacitors 303 and 307 are connected between the series of transistors 301, 305, and 309, which are all diode connected to keep the charge from flowing back to the left. The bottom branch is constructed of transistors 311, 315, and 319 and capacitors 313 and 317 arranged in the same manner as the top branch, but with the clocks reversed so the tow branches will alternately drive the output.

Although the transistors in FIG. 3A are connected to function as diodes, they are not ideal diodes, in the sense that there will be a voltage drop across each of transistors. Between the drain and source of each of these transistors will be a voltage drop. This voltage drop will be the threshold voltage, Vt, of the transistor when there is no current flowing and Vt AVds when there is current, where extra drain-source voltage drop can become proportionately quite large as current increases. Consequently, these voltage drops will reduce the output voltage of a real charge pump below that of the idealized charge pump like that discussed above in the Background with respect to FIG. 1.

Various methods are known to overcome this voltage drops. For example, the number of stages in each branch can be increased to just pump the voltage up higher and the later stages can be used to cancel the threshold voltages. Another example could be a four phase Vt cancellation scheme. However, these prior cancelation techniques have limitations of one sort or another. For example, increases in the number of stages results in increases for both the required layout area and power consumption. Further, as each subsequent transistor in the series is subjected to higher voltages, their respective voltage drops become higher and the incremental gain in each stage correspondingly diminishes. In a four phase Vt cancellation scheme, the clock skews used can be difficult to control due to mismatch and routings.

Instead, the threshold voltage can be cancelled by introducing a threshold voltage cancellation section that has the same structure as the main section of the charge pump that supplies the output. In the main section, rather than use the transistors connected as diodes, the threshold voltage cancellation stage uses the outputs from the section of the main section that it is mirroring to control the transistors. This will be illustrated using an exemplary embodiment based on a voltage doubler type of charge pump, which has been found to particular for use as an efficient low voltage output charge pump, where, in this example, the goal is to generate a target output of 4 volts from an input voltage of 2.5 volts.

More specifically, with an input voltage of Vcc=2.5 volts, to generate a 4 volt output supply able to deliver 2 mA output current, with minimum input current Icc and area requirements and good power efficiency is challenging. Normally, the sort of Dickson pump of FIG. 3 is the basic architecture for a charge pump; however, for these sorts of values, Dickson pumps have relatively large die size, higher Ice consumption and less efficiency. Normal Vt cancellation schemes are difficult to apply to such architectures. As noted above, these are normally implemented with Dickson pump by pumping to higher than 4 volts in order to meet the design requirement and overcome the higher internal impendence.

Figure 4A:
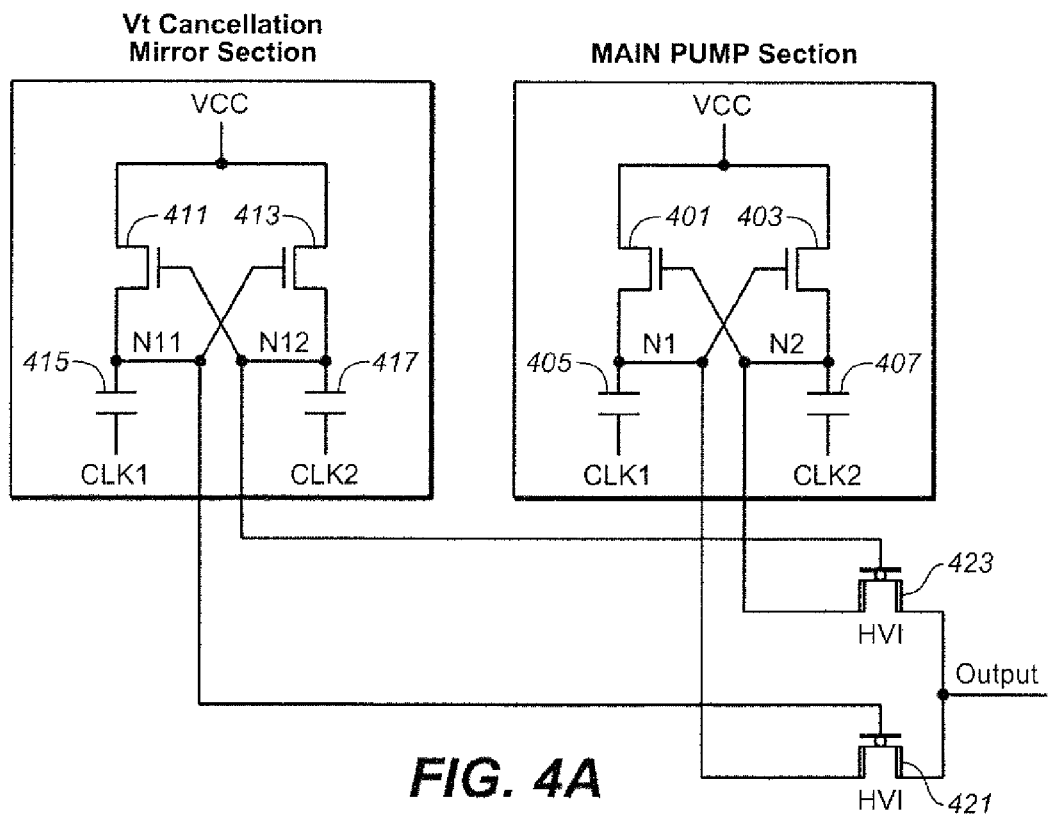
FIGS. 4A and 4B show an embodiment based on a voltage doubler-type of charge pump.
Figure 4B:
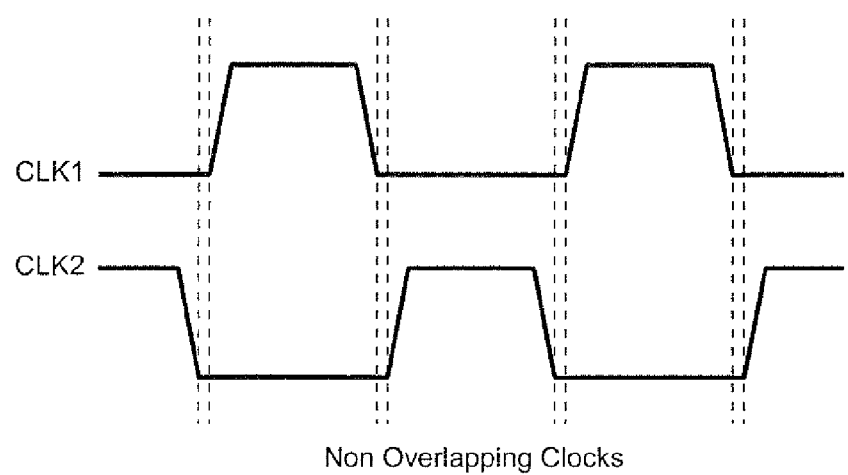

FIG. 4A shows the exemplary embodiment. The main, or output, pump section provides the output to drive the load and has the structure of a voltage doubler. the input voltage Vcc is provided to both branches and through transistor 401 to node N1 in the first branch and through transistor 403 to node N2 in the second branch. The control gates of each of these transistors is then attached to receive the voltage on the other branch, with the gate of 403 to node N1 and the gate of 401 to N2. Each of the nodes is also coupled to a capacitor, respectively capacitor 405 driven by the clock signal CLK1 and capacitor 407 driven by the clock signal CLK2. The clock signals are again non-overlapping clocks such as shown in FIG. 4B. The clock signals can be generated in any of the known manners. As the clocks alternate, the output of each branch will alternately (ideally) provide a doubled output voltage from the nodes N1 and N2, which are then combined to form the pump output.

To prevent the charge from flowing back from the output into the pump, the nodes N1 and N2 are respectively connected to the output through transistors 421 and 423. In a typical prior art arrangement, these two transistors would be connected as diodes, having their control gates connected to also receive the voltages on N1 and N2, respectively. However, this would result in the sort of voltage drops described above. Instead, a threshold voltage cancellation section, as shown on the left side of FIG. 4A is introduced to supply the control gate voltages for these output transistors 421 and 423.

The Vt cancellation section has the same structure and the output section and mirrors its function. A first branch includes transistor 411 and capacitor 415 and a second branch includes transistor 413 and capacitor 417, with the control gates of the transistor in each branch cross-coupled to the output node of the other branch. The output of each branch of the threshold cancellation stage is used to drive the output transistor of the corresponding branch in the output section: the node N11 of the cancellation section is used for the control gate voltage of transistor 421 and the node N22 of the cancellation section is used for the control gate voltage of transistor 423. Since the capacitors in the cancellation section are clocked the same as the same element that they mirror in the output section, when the node N1 of the output section is high, the node N11 in the cancellation section will also be high, so that transistor 421 is on and the output voltage passed; N1 and N11 will similarly be low at the same time, so that 421 is turned off to prevent the back flow of charge. The nodes N2, N22 and transistor 423 function similarly.

Although described here for a pump design based on a voltage doubler, this sort of arrangement for the cancellation of threshold can be used charge pump types. More generally, when used with other designs, in addition to the output section, which will be formed with the same architecture as usual, there will also be a voltage threshold cancellation section formed with the same structure. In the main output section, the transistors typically connected as diodes to charge from back flowing will now have their control gates connected to be set to a voltage from the mirrored node in the voltage cancellation section. For example, going back to FIG. 3A, taking the shown Dickson pump as the output section, a voltage cancellation stage of the same structure (less transistors 309 and 319, which take the role of 421 and 423 in FIG. 4A) would also be included. The level on the equivalent of the top plate of 307 on the cancellation stage would control the gate of 309, the level on the equivalent of the top plate of 303 would control the gate of 305, and so on for the other branch.

It should be noted that although the output section and the cancellation section have the same structure, the various mirrored elements of the circuits need not have the same size since the elements of the output stage need to drive the load of the charge pump, whereas those of the cancellation are only driving some control gates. Returning to the exemplary embodiment, the transistors 401 and 403 and capacitors 405 and 407 need provide sufficient output for the application (e.g., 4 volts and 2 mA). In contrast, the transistors 411 and 413 and capacitors 415 and 417 need only provide sufficient output for the control gate voltage of transistors 421 and 423, For example, if the transistors in the cancellation stages need only be sized a tenth or twentieth that of the elements they mirror in the output stage.

Aspects of the preceding discussion relevant here, including multi-stage operation, are discussed further in US patent publication No. US-2011-0133820-A1 and U.S. patent application Ser. No. 13/921,072.

Amplitude Modulation for Pass Gate to Improve Charge Pump Efficiency at Low Load Current For DC-DC converters, such as charge pumps, power efficiency is highly dependent on the converter's AC/DC current loading profile. Pump designs are typically done to meet the highest AC/DC current load for performance when the load is charging up, which is associated with highest power efficiency. Power efficiency for low or no load loading tends to be significantly lower due to the lesser output load. Due operations, the low or no DC/AC current load usually happens much more frequently than the high load current situation. Consequently, the overall power efficiency for operation is depends heavily on low/no DC/AC current power efficiency. Because of this, improving the overall power efficiency in operations is highly dependent upon improving the power efficiency of the pump with low/no DC/AC loads. The following looks at techniques to improve the overall power efficiency of charge pump in operations with varying DC/AC current loads and making NAND memory design more power conscious in systems.

Power efficiency is always an important metric in designing a DC-DC converter, such as charge pumps. The Vt cancellation scheme described above improves the power overall efficiency. The following techniques can further improve performance, particularly when pumps operate under low DC load current. The total power for the charge pump is the output power, $P_{out}$, and the quiescent power, $P_{quiescent}$. The power efficiency is then the ration of the output power to the total power, $P_{out}/(P_{out}+P_{quiescent})$. For a fixed $P_{out}$, if $P_{quiescent}$ is reduced, the efficiency will be increased. By reducing $P_{quiescent}$ a given amount, the power efficiency gain for low $P_{out}$ is greater than for high $P_{out}$, where power efficiency is almost independent of $P_{quiescent}$. For low $P_{out}$, an important factor in improving power efficiency is reducing $P_{quiescent}$.

When doing Vt cancellation as described above, the system normally clocks the pass gate (421 or 423 in FIG. 4A) with a rail to rail clock signal, or with an in between multiple of the rail voltage. In a first phase of the gate clocking, this is for Vt cancellation when passing the charge in main stage. In a second phase, the gate clocking prevents charge from the output leaking back into the internal stage which is resetting. However in the second phase, due to threshold voltage of the pass devices and associated body bias, there is no need to swing to the rail voltage (0V or Vdd), or multiple of the rail voltage during reset to cut off the reverse leakage. Instead, the swing can be at an intermediate level to cut off the leakage, consequently saving power. This can significantly reduce the switching power of the quiescent current, improving power efficiency.

Figure 5B:
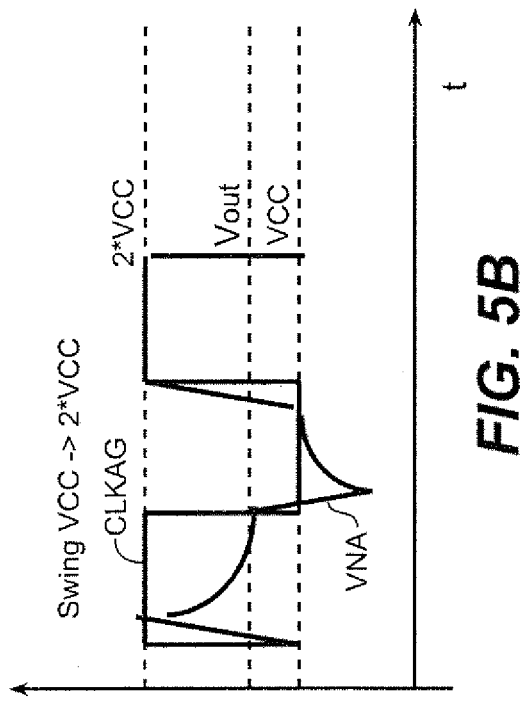
FIGS. 5A-C look at the general situation of amplitude modulation for a charge pump stage with two legs or branches connected between an input node and an output node providing Vout.
Figure 5C:
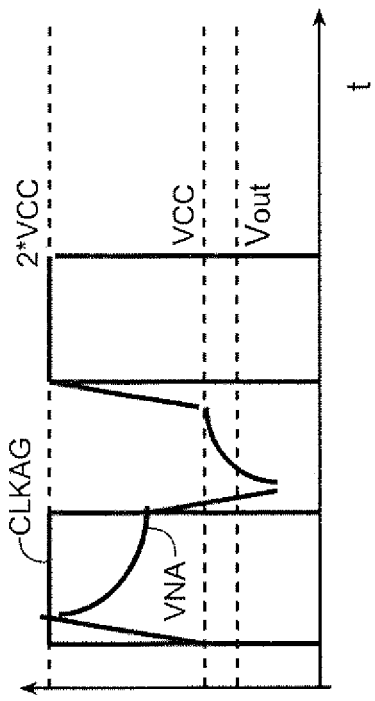
Figure 5A:
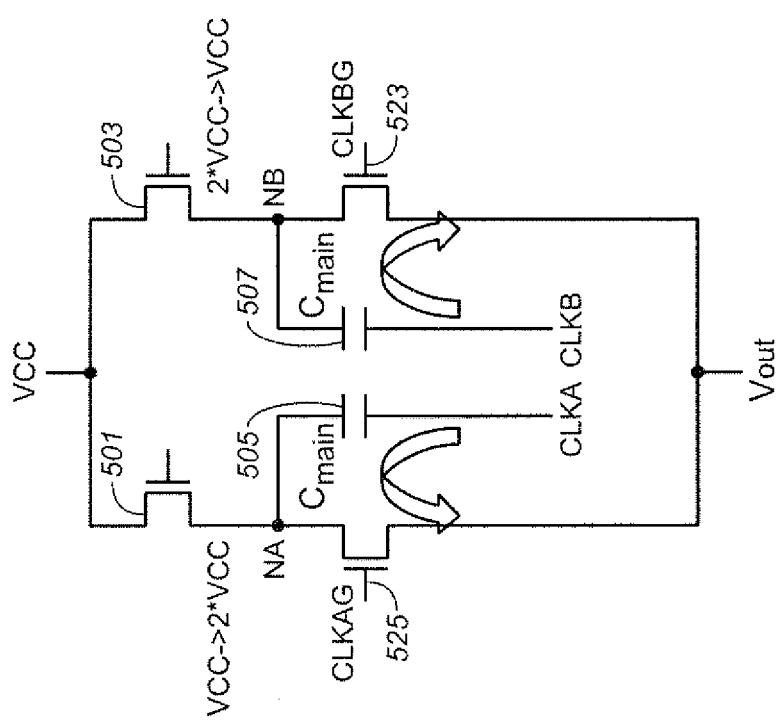

FIGS. 5A-C look at the general situation of amplitude modulation for a charge pump stage with two legs or branches connected between an input node at a voltage of Vcc and the output node providing Vout. In an exemplary embodiment, these two branches can be connected in a voltage doubler type of arrangement as in FIG. 4A, with the shown elements being numbered similarly to FIG. 4A ($C_{main}$ 505 corresponding to 405 and so on); but more generally, these could be two branches of a stage in Dickson or other type of charge pump. For any of these embodiments, the 505 and 507 respectively receive the clock signals CLKA and CLKB, corresponding to CLK1 and CLK2 of FIG. 4B. On the other side, the capacitors 505, 507 are connected at nodes NA, NB above respective pass gates 521, 523. The control gates of the transistors 521, 523 are respectively connected to receive the gate clocks CLKAG, CLKBG, where in the exemplary voltage doubler embodiment these can be generated in an auxiliary stage as is described above with respect to FIGS. 4A and 4B.

FIGS. 5B and 5C illustrate the waveforms for a cycle and half for CLKAG and the level at NA, $V_{NA}$, for a cycle. (The CLKBG and $V_{NB}$ traces will be similar, but half a cycle off in phase.) FIGS. 5B and 5C show two variations, where in FIG. 5B, the swing of CLKAG is between Vcc and 2Vcc, while in FIG. 5C a full swing between 0V and 2Vcc is used. The pass gates 521, 523 are used to allow the level on NA, NB to pass to the output node when these internal nodes are high, but cut off any reverse flow when the other leg is supplying the output. Either of FIG. 5B or 5C is a fairly typical arrangement, with the CLKAG swinging between 0V and 2*Vcc or Vcc and 2*Vcc. The high of 2VCC allows the gates to pass the NA/NB node charge to Vout, while the low level of 0V or Vcc cuts off the leakage path back through the other pass gate. However, due to the threshold value Vt of the pass gates, to turn the pass gate off and prevent reverse current, the value on their control gates can have a low value that is raised above either 0V or Vcc, as long control gate value is not higher that the voltage on the source offset by the this threshold value. For instance, for an NMOS with a Vt of 0.4V, to prevent reverse charge feedback from Vout to NA, CLKAG's low end can be Vcc+Vt.

For example, considering the case where Vcc=2.5V, Vout=3V, and Vt=0.4V, for the full swing case the high CLKAG level is 2*Vcc=5v and the low value is 0V. In the half swing case, the high is 2*Vcc=5V and low is Vcc=2.5V. If instead the gate clocks swing between a high of 2*Vcc=5V and low of 2.5+0.4V=2.9V, the pass gates will still provide the desired function, but same on current and power. Looking at the ratios, for full swing this gives: (5−2.9)/(5−0)=0.42, or a savings of 58%. For half swing: (5−2.9)/(5−2.5)=0.82, or a saving of 18%.

Figure 6:
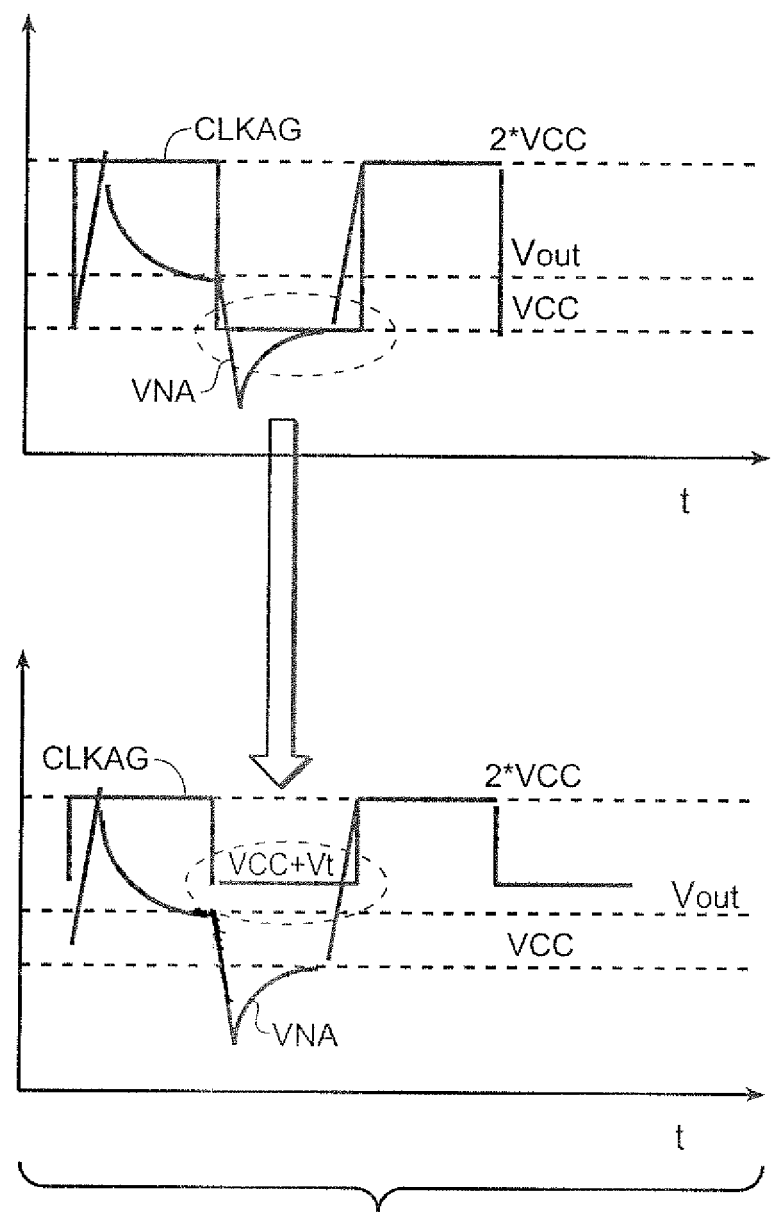
FIG. 6 compares gate clock signals without and with a threshold voltage offset.

FIG. 6 compares the waveforms of FIG. 5B to the version using the offset: At top, FIG. 5B is repeated; below is the modified CLKAG waveform that has the Vt offset for its low value. The high value of CLKAG is unchanged, allowing $V_{NA}$ to pass when this leg is providing the output. The low value of CLKAG is now Vcc+Vt, where Vt is the threshold voltage of the pass gate. This value is still low enough to prevent charge from flowing back though the pass gate, but reduces the swing, thereby improving efficiency.

Figure 7:
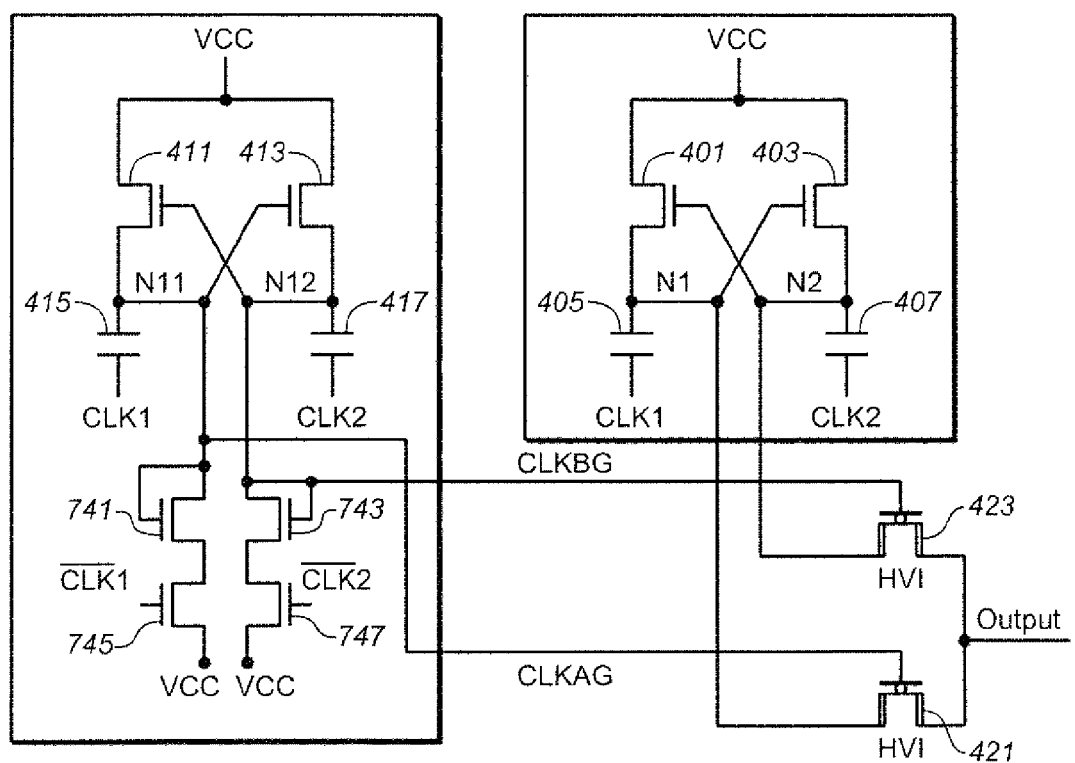
FIG. 7 is schematic representation for an exemplary embodiment.

The Vt offset for the pass gate's low clock value can be effect in a number of ways. FIG. 7 gives an example based on a voltage doubler-type of embodiment for the pump of FIG. 4A. In FIG. 7, the elements of FIG. 4A repeated, with the Vt cancellation modified to provide the reduced minimum voltage swing for the pass gates 421 and 423. Now nodes N11 and N12 are respectively connected to Vcc through the transistors 745 and 747. To take nodes N11, N12 low when CLK1, CLK2 are respectively low, the transistors 745, 747 respectively receive these clock signals in inverted form or, alternately, respectively receive CLK2, CLK1 as in most implementations CLK2, CLK1 are similar waveforms to the inverted versions of each other.

The Vt offset above Vcc can be implemented in various ways, such as with using a bias current to limit the gate voltage for a transistor 741, 743 in each leg. In the exemplary embodiment of FIG. 7 to provide the Vt offset above Vcc for the low value, this connection is done by way of a diode, respectively 741 and 743, to raise N11 and N12 to have a low value of Vcc+Vt, where the diodes are used to mimic the Vt of the pass gates.

Although the exemplary embodiment of FIG. 7 is based on a single stage for a voltage doubler type of pump, the ideas can be applied more generally. For example, this approach can be applied to other types of charge pumps, such Dickson type pumps, and multi-stage pumps of various types. For any of these variations, improved power efficiency under all condition can be obtained, particularly improve power efficiency at low, or no, load condition. As discussed above, in terms of figures of merit (FOM), the techniques of this section address the power burned in the Vt cancellation circuit of a pump system, which is part of the quiescent power consumption from the power supply that does not go into the output. As the power efficiency is the ration of the output power to the total power, reducing the quiescent contribution to the total power this way can significantly help with the goal of power saving under all condition, particularly under low/no DC/AC load.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

It is claimed:

1. A method of operating a charge pump circuit, the charge pump including one or more stages each having one or more legs, including a first leg connected between an output node for the corresponding stage and an input node for the corresponding stage receiving an input voltage for the stage, and the first leg has a first capacitor with a first plate connected to an internal node thereof and a first output transistor connected between the internal node and the output node of the corresponding stage, the method comprising:
    applying a first clock signal to a second plate of first capacitor, the first clock signals value alternating between a high value and a low value;
    applying a second clock signal to the gate of the first output transistor, wherein the second clock signal is of the same phase as the first clock signal, and wherein the second clock signal has a low value that is higher than the input voltage for the stage, being offset above the input voltage by an amount not more than the than the threshold voltage of the first output transistor; and
    generating the second clock signal from the first clock signal using an auxiliary charge pump section including one or more stages each having one or more legs, the second clock signal being generated by a first of the legs thereof,
    wherein the first leg of the auxiliary charge pump section is connected to ground through a diode, whereby the voltage offset is implemented.

2. The method of claim 1, wherein the second clock signal has a high value not lower than value at the internal node when the first clock signal is high.

3. The method of claim 1, wherein the voltage offset is set to be the threshold voltage of the first output transistor.

4. The method of claim 1, wherein the stage to which the first leg belongs further includes a second leg connected in parallel with the first leg between the input and output nodes for the corresponding stage, the first and second legs being connected according to a voltage doubler arrangement.

5. The method of claim 1, wherein the change pump includes multiple stages connected in series, where the output node of the last stage in the series provides the output of the charge pump and where, for each stage except for the last of the series, the output node of each stage is connected to the input node of the subsequent stage.

6. The method of claim 1, wherein the stages of the series alternately receive one of two non-overlapping first clock signals.

7. A method of operating a charge pump circuit, the charge pump including one or more stages each having one or more legs, including a first leg connected between an output node for the corresponding stage and an input node for the corresponding stage receiving an input voltage for the stage, and the first leg has a first capacitor with a first plate connected to an internal node thereof and a first output transistor connected between the internal node and the output node of the corresponding stage, the method comprising:
    applying a first clock signal to a second plate of first capacitor, the first clock signals value alternating between a high value and a low value;
    applying a second clock signal to the first output transistor, wherein the second clock signal is of the same phase as the first clock signal, and wherein the second clock signal has a low value that is higher than the input voltage for the stage, being offset above the input voltage by an amount not more than the than the threshold voltage of the first output transistor; and
    generating the second clock signal from the first clock signal using an auxiliary charge pump section including one or stages each having one or more legs, the second signal being generated by a first of the legs thereof,
    wherein the first leg of the auxiliary charge pump section is connected to ground through a transistor whose gate is biased to a level to provide the offset voltage.

8. The method of claim 7, wherein the second clock signal has a high value not lower than value at the internal node when the first clock signal is high.

9. The method of claim 7, wherein the voltage offset is set to be the threshold voltage of the first output transistor.

10. The method of claim 7, wherein the stage to which the first leg belongs further includes a second leg connected in parallel with the first leg between the input and output nodes for the corresponding stage, the first and second legs being connected according to a voltage doubler arrangement.

11. The method of claim 7, wherein the change pump includes multiple stages connected in series, where the output node of the last stage in the series provides the output of the charge pump and where, for each stage except for the last of the series, the output node of each stage is connected to the input node of the subsequent stage.

12. The method of claim 7, wherein the stages of the series alternately receive one of two non-overlapping first clock signals.

* * * * *

UNITED STATES PATENT AND TRADEMARK OFFICE
CERTIFICATE OF CORRECTION

PATENT NO.      : 9,083,231 B2  
APPLICATION NO. : 14/041522  
DATED           : July 14, 2015  
INVENTOR(S)     : Pan et al.

Page 1 of 1

It is certified that error appears in the above-identified patent and that said Letters Patent is hereby corrected as shown below:

In the claims

Column 8, line 40, Claim 7, after "one or" please insert -- more --.

Signed and Sealed this  
Tenth Day of November, 2015

Michelle K. Lee  
*Director of the United States Patent and Trademark Office*